Figure 1A:
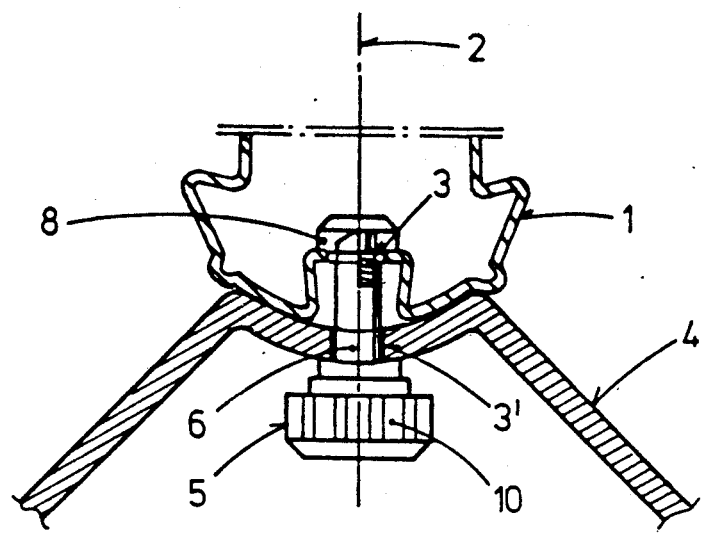

United States Patent [19]

Jerabek

[11] Patent Number: 5,044,856
[45] Date of Patent: Sep. 3, 1991

[54] FASTENING ELEMENT SECURED AGAINST ROTATION FOR A STRUCTURAL PART TO BE REMOVABLY ATTACHED TO A SUPPORTING ARRANGEMENT

[75] Inventor: Harald Jerabek, Müllheim, Fed. Rep. of Germany

[73] Assignee: Protoned B.V., Amsterdam, Netherlands

[21] Appl. No.: 528,749

[22] Filed: May 24, 1990

[30] Foreign Application Priority Data

Jun. 21, 1989 [CH] Switzerland .................. 2308/89

[51] Int. Cl.⁵ .................................. A44B 17/00
[52] U.S. Cl. .......................... 411/551; 411/349
[58] Field of Search ............... 411/349, 549–553, 411/971; 24/590, 591, 596, 628

[56] References Cited

U.S. PATENT DOCUMENTS

| | | | |
|---|---|---|---|
| 1,895,826 | 1/1933 | Trudeau | 411/552 X |
| 2,177,215 | 10/1939 | Hodgkinson | 411/349 X |
| 2,695,436 | 11/1954 | Marschner | 411/552 |
| 2,745,162 | 5/1956 | Zahodiakin | 411/551 |
| 2,882,580 | 4/1959 | Barsalou | 411/551 |
| 3,171,182 | 3/1965 | Danehy | 411/349 X |
| 3,204,680 | 9/1965 | Barry | 411/551 |
| 4,040,151 | 8/1977 | Brimm | 411/551 |
| 4,047,266 | 9/1977 | Bisbing | 411/349 |
| 4,441,843 | 4/1984 | Wright et al. | 411/349 |
| 4,801,232 | 1/1989 | Hempel | 24/596 X |

FOREIGN PATENT DOCUMENTS

| | | | |
|---|---|---|---|
| 617706 | 4/1961 | Canada | 411/349 |
| 2002920 | 7/1971 | Fed. Rep. of Germany | 411/551 |
| 646556 | 11/1950 | United Kingdom | 411/349 |
| 837452 | 6/1960 | United Kingdom | 411/349 |

*Primary Examiner*—Rodney M. Lindsey
*Assistant Examiner*—Jerry Redman
*Attorney, Agent, or Firm*—Ralph W. Selitto, Jr.

[57] ABSTRACT

Fastening element (5) secured against rotation for a structural part (4) to be removably attached to a supporting arrangement (1), which has a screw bolt (7) and a locking nut (10) to be tightened on the front side of the structural part (4). The screw bolt (7) is situated rotatably and longitudinally movably in an adaptor sleeve (6) which has a shaft part (6.1), which engages with little play in corresponding openings of the supporting arrangement (1) and of the structural part (4). The screw bolt (7) has at its inner end a hammer head (8), the cross-sectional shape of which is adjusted to that of the shaft part (6.1) of the adaptor sleeve (6) and which can be brought from an insertion position into a locking position swivelled through approximately 90° to it. The structural part to be attached to the supporting arrangement (1) is forcibly held in position by means of penetration openings of equal area which are matched to the cross-sectional shape of the shaft part (6.1) of the adaptor sleeve (6).

6 Claims, 2 Drawing Sheets

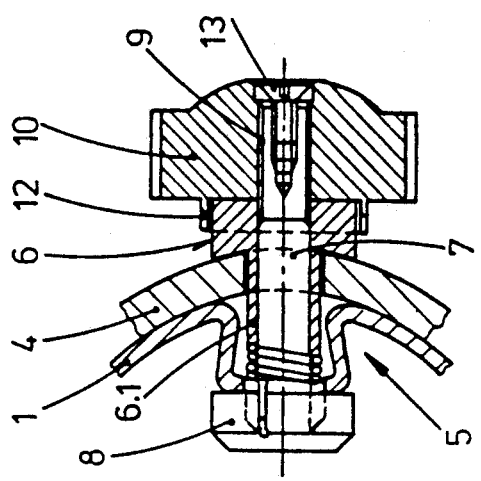
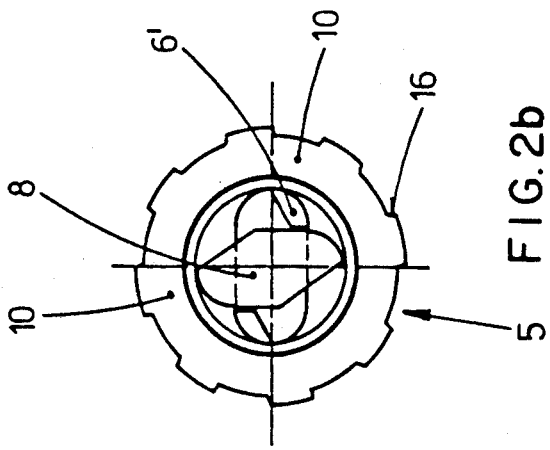
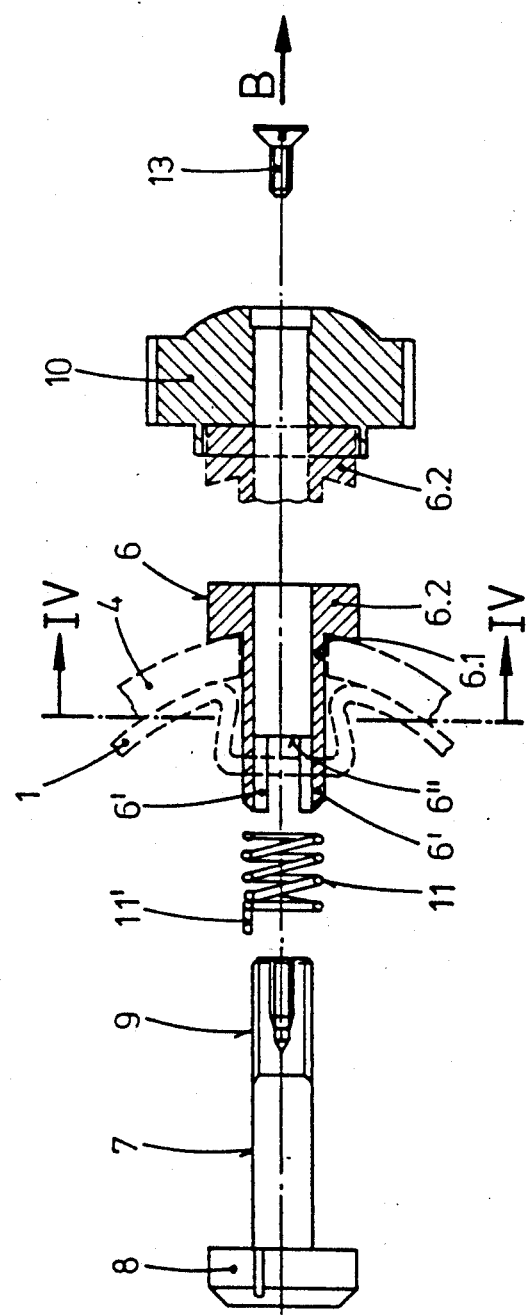
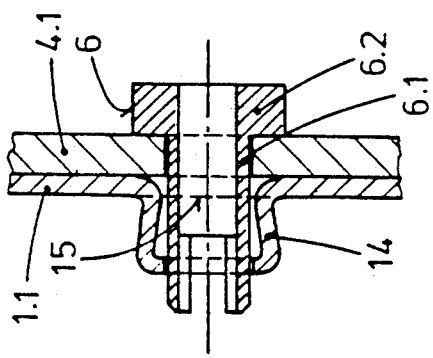
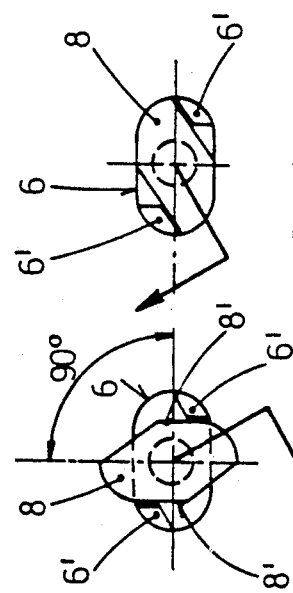
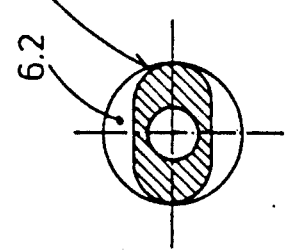

FASTENING ELEMENT SECURED AGAINST ROTATION FOR A STRUCTURAL PART TO BE REMOVABLY ATTACHED TO A SUPPORTING ARRANGEMENT

The present invention relates to a fastening element secured against rotation for a structural part to be removably attached to a supporting arrangement.

It is known to provide structural parts, such as brackets or shelf-holders of goods presentation systems, to be removably fastened to pillars or support walls with suspension hooks which are intended to engage in slot-shaped recesses of their supporting arrangement. Although in this manner it is very easy to build systems which can be adapted to different applications and manufactured relatively cheaply, however, as a result of the simple insertion fastening, they cannot be assembled very sturdily. Screw and clamp connections are also known which, although they bring about secure clamping between the supporting arrangement and the structural parts to be fastened to it, in most cases, however, have an aesthetically unsatisfactory effect. In cases in which security against rotation is necessary, such as in the case of shelf-holders or brackets with eccentric fastening, constructional measures are additionally necessary on both the supporting arrangement and the structural part to be fixed, in order to prevent swiveling movements. In the case of screw connections with tapped holes in a pillar or a support wall, there is an increased risk of dirtying in the event of unused connection points and the risk of thread damage.

It is thus the object of the invention to produce a fastening element secured against rotation for structural parts to be removably attached to pillars or support walls, which passes through a receiving opening of the removable structural part, in the dismounted state of the structural part is connected captively to the latter, and also contains a headpiece which is intended to engage in a counter-opening in the supporting arrangement and has a locking member which can be inserted through a counter-opening and tightened behind it.

The advantage of such a fastening element is its practically universal applicability for structural parts which are to be fastened rapidly and sturdily, and subsequently interchanged, on pillar and wall arrangements, and its easy handling.

An exemplary embodiment of the fastening element according to the invention is described below with reference to the drawings.

Figure 1B:
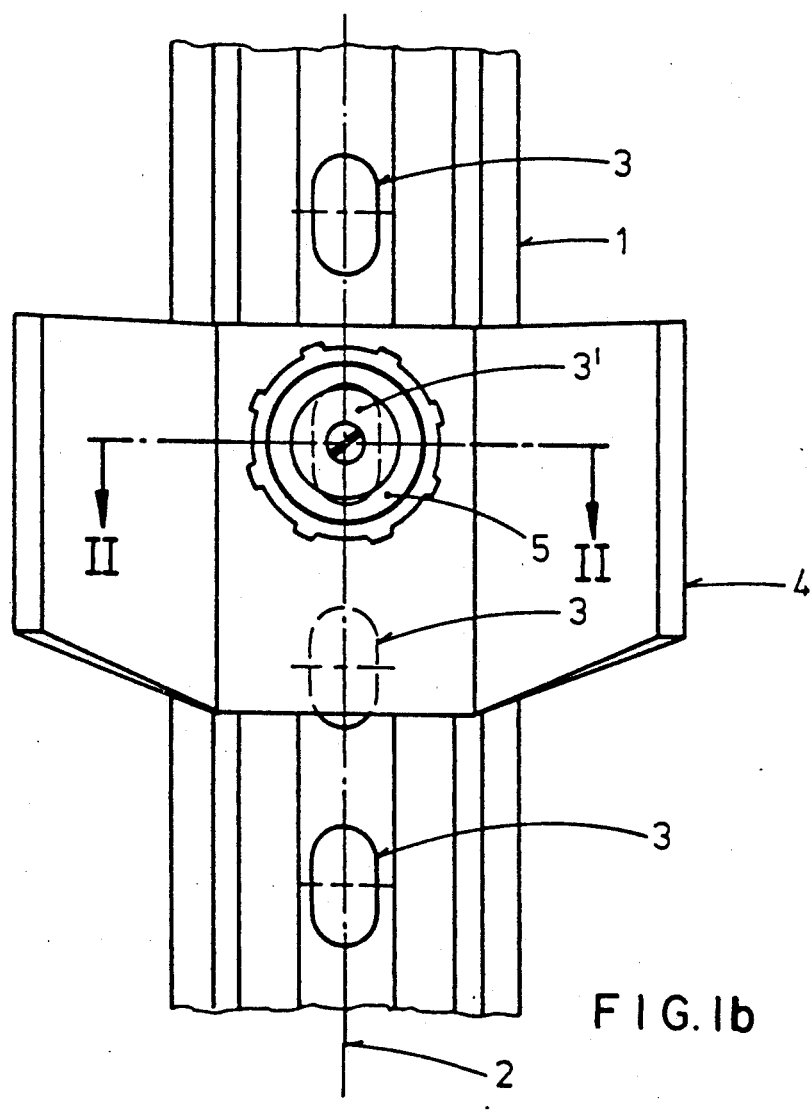

FIG. 1, including FIGS. 1a, 1b, shows an exemplary application of a fastening element according to the invention in a cross-sectional and a front view, FIG. 2, including FIGS. 2a, 2b shows a longitudinal cross-sectional (II—II in FIG. 1) and a front view of the fastening element, FIG. 3 shows the components of the fastening element in a dismantled, representation, FIG. 4 shows a cross-section through the adaptor sleeve of the fastening element in the plane IV—IV in FIG. 3, FIG. 5, including FIGS. 5a, 5b, shows schematically the positions of the locking member relative to the shaft of the adaptor sleeve in a) insertion position and b) locking position of the fastening element, and FIG. 6 shows a detail of the fastening element for use on a support wall.

In FIGS. 1a, 1b, 1 indicates a supporting arrangement in the form of a profiled hollow pillar which has a number of penetration openings 3 arranged on one or more parallel vertical longitudinal axes 2 at, e.g. uniform intervals (and heights). 4 designates a structural part, e.g. a twin-armed bracket or a shelf-rest, which is to be attached to the supporting arrangement or pillar 1 and which can be attached to the pillar 1 in a vibration-proof relationship by means of a fastening element 5 designed according to the invention. As can be seen from FIG. 1a, a component of the fastening element 5 which is designed as an adaptor sleeve 6 passes through, one after the other firstly a receiving opening 3' in the structural part 4 to be attached and then the penetration opening 3 in the pillar 1. Both openings 3, 3' have the same cross-sectional shape and, instead of the elongated slot shape shown, can also have another configuration which deviates from round.

As is described below with reference to FIG. 4, the shape of the openings 3, 3' corresponds to the cross-sectional shape of the adaptor sleeve 6, which has a shaft part 6.1 which brings about both a centering of the structural part 4 on the pillar 1 and a security against rotation between the latter and the structural part 4. The fastening of the structural part 4 to the pillar 1 is carried out by means of a screw bolt 7 (FIGS. 2, 3) which is described below and which has at its one (inner) end a hammer head 8 and at its other (outer) end a threaded section 9 on which a locking nut 10 is located.

Upon the application of the structural part 4, in the penetration opening 3 of which the fastening element 5 is already inserted and loosely held by the hammer head 8, the locking nut 10 is first of all turned to the left until a stop is reached. By these means the hammer head 8 is brought in the direction of the arrow into the "closed" position according to FIG. 5a, and the fastening element 5 together with the structural part 4 can be mounted on the pillar 1. In this connection the hammer head 8 and stop members 6' at the front end of the adaptor sleeve 6 pass through the selected penetration opening 3 on the pillar 1 and determine the relative position between the latter and the structural part 4. After release of the locking nut 10, the screw bolt 7, which is tensioned by a spring 11 (see the explanation with reference to FIG. 3), swivels back (arrow in FIG. 5b) and the hammer head 8 turns through approximately 90° transversely into its locking position according to FIGS. 1a and 5b. The locking nut 10 is then turned to the right, as a result of which the threaded section 9 of the screw bolt 7 is drawn into the locking nut 10 and the connection fixed.

The fastening element 5 corresponding to the above method of operation can be seen in detail in FIGS. 2 to 5.

The component situated innermost in the fastening element 5 is the screw bolt 7 which has the hammer head 8. On the shaft of the screw bolt 7, the compression and torsion screw spring 11 is mounted, of which one end 11' is supported on the hammer head 8 and the other end on the front end 6" of the adaptor sleeve 6 in such a manner that, as shown in FIG. 5b, at rest the hammer head 8 is swivelled into the abovementioned locking position. In this connection, two of its diagonally opposite sides 8', turned through approximately 90° in relation to the adaptor sleeve outline, bear against stop members 6' which project like teeth beyond the front end of the adaptor sleeve 6.

Over the shaft of the screw bolt 7, the adaptor sleeve 6 is situated, at the front end of which the screw spring 11 is supported in a contact pressure relationship.

By these means the screw bolt 7 is released from its engagement on the structural part 4. The cross-sectional areas of the adaptor sleeve 6 (FIG. 4), of the penetration openings 3 and of the receiving opening 3' correspond with little play and center the pillar 1 and the structural part 4 on one another. The adaptor sleeve 6 is provided with a supporting collar 6.2 which is turned towards the locking nut 10 and by means of which the fastening element 5 is supported on the structural part 4. A centering bush 12 on the inner side of the locking nut 10 centers the latter on the supporting collar 6.2 of the adaptor sleeve 6. To limit the inward movement of the locking nut 10 on the screw bolt 7, a countersunk screw 13 is provided, which engages in the end of the bolt.

To use the fastening element according to the invention to attach different structural parts 4.1 to different supporting arrangements 1.1, such as support walls or mounting rails according to FIG. 6, in principle only the shaft length of the adaptor sleeve 6 and the length of the screw bolt 7 need to be adapted in each case. In this connection, the supporting arrangement 1.1 can be designed either with a receiving groove 14 with penetration openings 3 punched in it as shown in FIG. 1a or flat and provided with a row of holes as is indicated by broken lines 15. Instead of the locking nut 10 which has a handle structure 16 (FIG. 2b), a nut which has pronounced key faces can be used.

I claim:

1. A fastening device for fastening a structural member to a supporting arrangement, the structural member having a first opening with a non-circular cross-sectional shape, and the supporting member having a second opening with a non-circular cross-sectional shape, said device comprising an adapter sleeve having a front end with a non-circular cross-sectional shape, a rear end, and a bore extending from said front end to said rear end, said front end being adapted to engage the first and second openings; a bolt having a first end adapted to extend through the first and second openings, a second end adapted to be received in said bore of said adaptor sleeve, a hammer head attached to said first end of said bolt and having a cross-sectional shape that matches said cross-sectional shape of said front end of said adapter sleeve, whereby said hammer head abuts against the supporting member when said hammer head is rotated by said bolt relative to said adapter sleeve; and limiting means attached to said front end of said adapter sleeve for limiting the rotation of said hammer head by approximately 90 degrees in relation to said adapter sleeve.

2. A fastening device according to claim 1, further comprising biasing means located between said first end of said bolt and said front end of sad adapter sleeve for rotating said hammer head from a biased position towards an unbiased position; and releasable locking means located at said second end of said adapter sleeve for releasably locking said hammerhead in said biased position, said hammer head being rotated towards said unbiased position when said locking means is released.

3. A fastening device according to claim 2, wherein said biasing means includes a torsion spring that is coaxially mounted about said bolt, said torsion spring having one end supported on said limiting means and another end supported on said hammer head.

4. A fastening device according to claim 1, wherein said second end of said adapter sleeve terminates in a supporting collar, and wherein said releasable locking means includes a locking nut attached to said second end of said bolt and centering means attached to said locking nut for centering said collar on said locking nut.

5. A fastening device according to claims 1, 2, or 4, wherein said locking means further includes a screw extending into said locking nut to engage said second end of said bolt such that longitudinal movement of said bolt in said locking nut is controlled.

6. A fastening device according to claim 1, wherein said limiting means includes a plurality of stop members.

* * * * *